US010644307B2

(12) United States Patent
Ohta et al.

(10) Patent No.: US 10,644,307 B2
(45) Date of Patent: May 5, 2020

(54) SLURRY COMPOSITION FOR NON AQUEOUS ELECTROLYTE BATTERY ELECTRODE, AND NON AQUEOUS ELECTROLYTE BATTERY POSITIVE ELECTRODE AND NON AQUEOUS ELECTROLYTE BATTERY USING SAME

(71) Applicant: KURARAY CO., LTD., Kurashiki-shi (JP)

(72) Inventors: Yuki Ohta, Okayama (JP); Toshimitsu Tanaka, Okayama (JP); Junji Fujioka, Okayama (JP); Jun-Sang Cho, Okayama (JP); Hideharu Iwasaki, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/749,270

(22) PCT Filed: Aug. 5, 2016

(86) PCT No.: PCT/JP2016/073047
§ 371 (c)(1),
(2) Date: Jan. 31, 2018

(87) PCT Pub. No.: WO2017/022844
PCT Pub. Date: Feb. 9, 2017

(65) Prior Publication Data
US 2018/0226634 A1 Aug. 9, 2018

(30) Foreign Application Priority Data

Aug. 6, 2015 (JP) ................................ 2015-156094

(51) Int. Cl.
*H01M 4/1391* (2010.01)
*H01M 4/62* (2006.01)
*H01M 10/052* (2010.01)
*C08L 35/00* (2006.01)
*H01M 4/04* (2006.01)
*C08L 33/02* (2006.01)
*H01M 4/02* (2006.01)

(52) U.S. Cl.
CPC ........... *H01M 4/1391* (2013.01); *C08L 33/02* (2013.01); *C08L 35/00* (2013.01); *H01M 4/0404* (2013.01); *H01M 4/62* (2013.01); *H01M 4/622* (2013.01); *H01M 4/623* (2013.01); *C08L 2203/20* (2013.01); *H01M 10/052* (2013.01); *H01M 2004/028* (2013.01)

(58) Field of Classification Search
CPC .... H01M 4/0404; H01M 4/1391; H01M 4/62; H01M 4/622; H01M 4/623; H01M 10/052; H01M 2004/028
See application file for complete search history.

(56) References Cited

U.S. PATENT DOCUMENTS

| | | | | |
|---|---|---|---|---|
| 5,891,593 A * | 4/1999 | Keller | .................... | H01M 4/13 429/217 |
| 2005/0095503 A1 | 5/2005 | Adachi et al. | | |
| 2007/0287064 A1* | 12/2007 | Suzuki | .................. | H01G 11/38 429/217 |
| 2013/0252077 A1 | 9/2013 | Iwasaki et al. | | |
| 2014/0087250 A1* | 3/2014 | Coowar | ................ | H01M 4/134 429/211 |
| 2015/0207148 A1* | 7/2015 | Kimura | ................. | H01M 4/622 429/199 |

FOREIGN PATENT DOCUMENTS

| | | |
|---|---|---|
| JP | 2000-67917 A | 3/2000 |
| JP | 2005-100661 A | 4/2005 |
| JP | 2008-288214 A | 11/2008 |
| JP | 2010-9940 A | 1/2010 |
| JP | 2013-201097 A | 10/2013 |
| JP | 2014-13693 A | 1/2014 |
| JP | 2014-510362 A | 4/2014 |
| KR | 10-2014-0018255 A | 2/2014 |
| WO | 2006/085416 A1 | 8/2006 |

OTHER PUBLICATIONS

Office Action dated Jan. 16, 2019 in Korean Patent Application No. 10-2018-7006236, 9 pages (with unedited computer generated English translation obtained from the EPO Global Dossier service).
International Search Report dated Nov. 8, 2016 in PCT/JP2016/073047 filed Aug. 5, 2016.

* cited by examiner

*Primary Examiner* — Adam A Arciero
(74) *Attorney, Agent, or Firm* — Oblon, McClelland, Maier & Neustadt, L.L.P.

(57) ABSTRACT

The present invention pertains to a slurry composition for non aqueous electrolyte battery electrodes that includes a binder composition, an active material, and a solvent, in which the active material is a lithium-containing metal oxide, the binder composition contains a neutralized salt of an α-olefin-maleic acid copolymer in which an α-olefin and a maleic acid are copolymerized, and the degree of neutralization for carboxylic acid generated from the maleic acid in the copolymer is from 0.3 to 1.0. The present invention further pertains to a non aqueous electrolyte battery positive electrode and a non aqueous electrolyte battery using the slurry composition for non aqueous electrolyte battery electrodes.

10 Claims, No Drawings

SLURRY COMPOSITION FOR NON AQUEOUS ELECTROLYTE BATTERY ELECTRODE, AND NON AQUEOUS ELECTROLYTE BATTERY POSITIVE ELECTRODE AND NON AQUEOUS ELECTROLYTE BATTERY USING SAME

TECHNICAL FIELD

The present invention relates to a slurry composition for non aqueous electrolyte battery electrodes, as well as a non aqueous electrolyte battery positive electrode and a non aqueous electrolyte battery using the same.

BACKGROUND ART

In recent years, prevalence of portable terminals such as a portable phone, a notebook type personal computer, and a pad type information terminal apparatus is considerable. A non aqueous electrolyte battery is used as a secondary battery that is used as a power source for these portable terminals. Since a more comfortable portability is demanded in the portable terminals, scale reduction, thickness reduction, weight reduction, and performance enhancement of the portable terminals are rapidly developing, and the portable terminals are coming to be used in various fields. This trend is currently still continuing, and further scale reduction, thickness reduction, weight reduction, and performance enhancement of batteries used in the portable terminals are also demanded.

A non aqueous electrolyte battery has a structure such that a positive electrode and a negative electrode are disposed via a separator and housed in a container together with an electrolytic solution obtained by dissolving a lithium salt such as $LiPF_6$, LiTFSI (lithium (bistrifluoromethylsulfonylimide)), or LiFSI (lithium (bisfluorosulfonylimide)) into an organic liquid such as ethylene carbonate.

Typically, the positive electrode and the negative electrode are formed in such a manner that a slurry for electrodes, which is obtained by dissolving or dispersing a binder and a thickening agent into water and mixing the resulting material with an active material, an electroconductive auxiliary agent (electroconductivity imparting agent) that is added in accordance with the needs, and the like (the slurry for electrodes may hereafter simply referred to as a slurry), is applied onto a current collector, followed by drying water to bind as a mixed layer. More specifically, for example, the positive electrode is formed in such a manner that $LiCoO_2$ or the like serving as an active material, carbon black serving as an electroconductive auxiliary agent that is added in accordance with the needs, and the like are bound with each other onto a current collector such as an aluminum foil with use of a binder for secondary battery electrodes. On the other hand, the negative electrode is formed in such a manner that a carbonaceous material serving as an active material capable of intercalating and deintercalating lithium ions and an electroconductive auxiliary agent that is similar to that of the positive electrode and added in accordance with the needs, and the like are hound with each other onto a current collector such as copper with use of a binder for secondary battery electrodes.

Hereto, polyvinylidene fluoride (PVdF) is typically used as a binder for positive electrodes (for example, Patent Literature 1). However, PVdF necessitates N-methyl-2-pyrrolidone (NMP) serving as an organic solvent, thereby raising a problem in terms of burden on the environment. In addition, PVdF swells by dint of the electrolytic solution when present under a high-temperature environment of 50° C. or higher, whereby the binding force weakens, and also the electric resistance increases, so that PVdF is deficient in terms of high-temperature durability.

On the other hand, in the negative electrodes, use of an aqueous binder is already foregoing for consumer purposes (personal computers, portable phones, and the like), and examples thereof include diene-based rubbers such as styrene-butadiene rubber and acrylic series such as polyacrylic acid (for example, Patent Literatures 2 and 3). Examples of the thickening agent include methyl cellulose, ethyl cellulose, hydroxyethyl cellulose, hydroxypropoxycellulose, carboxymethyl cellulose-sodium salt (CMC-Na), and sodium polyacrylate. Among these, CMC-Na is often used (for example, Patent Literature 4).

The reasons why it is difficult to use an aqueous binder in the positive electrodes, unlike in the negative electrodes, are as follows:

(1) the aqueous binder undergoes oxidation decomposition when the battery is charged;

(2) it is difficult to disperse the slurry uniformly;

(3) when it is attempted to increase the positive electrode capacity by thick coating, cracks are generated in the electrode due to cohesion stress caused by drying. As a result, a sufficient electric conduction path is not ensured in the electrode, so that the high-rate discharge characteristics decrease as the battery characteristics;

(4) by contact and reaction of the positive electrode active material with water, lithium serving as a positive electrode active material elutes, and cracks are generated in the electrode, leading to decrease in the positive electrode capacity and the cycle characteristics;
and the like.

The present invention has been made in view of the aforementioned circumstances, and an object thereof is to provide a slurry composition for non aqueous electrolyte batteries that is electrically and thermally stable even when an aqueous binder is used, and that can achieve a high discharge capacity retention ratio without decreasing the positive electrode active material capacity.

CITATION LIST

Patent Literature

Patent Literature 1: Japanese Unexamined Patent Publication No. 2013-201097

Patent Literature 2: Japanese Unexamined Patent Publication No. 2000-67917

Patent Literature 3: Japanese Unexamined Patent Publication No. 2008-288214

Patent Literature 4: Japanese Unexamined Patent Publication No. 2014-13693

SUMMARY OF INVENTION

The present inventors have made eager researches in order to solve the aforementioned problems and, as a result, have found out that the aforementioned object can be achieved by using a slurry composition for non aqueous electrolyte batteries that has the following constitution. Based on this finding, the present inventors have made further studies and have thereby completed the present invention.

That is, a slurry composition for non aqueous electrolyte battery electrodes that contains a binder composition, an active material, and a solvent according to one aspect of the present invention (which may hereafter be simply referred to as a slurry composition) is characterized in that the active material is a lithium-containing metal oxide, that the binder composition contains a neutralized salt of an α-olefin-maleic acid copolymer in which an α-olefin and a maleic acid are copolymerized, and that a degree of neutralization for carboxylic acid generated from the maleic acid in the copolymer is from 0.3 to 1.0.

According to the present invention, a slurry composition containing a binder composition for non aqueous electrolyte batteries being excellent in the binding property, an active material, and a solvent can be obtained, and further an improvement in the battery characteristics of non aqueous electrolyte electrodes can be realized by using the slurry composition.

DESCRIPTION OF EMBODIMENTS

Hereafter, the embodiments of the present invention will be described in detail; however, the present invention is not limited to these alone.

The binder composition for non aqueous electrolyte batteries (which may hereafter be referred to simply as a binder composition) contained in the slurry composition for non aqueous electrolyte battery electrodes according to the present embodiment is characterized by containing a neutralized salt of an α-olefin-maleic acid copolymer in which an α-olefin and a maleic acid are copolymerized, and having a degree of neutralization of 0.3 to 1.0.

In the present embodiment, the α-olefin-maleic acid copolymer in which an α-olefin and a maleic acid are copolymerized is composed of a unit (A) based on the α-olefin and a unit (B) based on the maleic acid, and it is preferable that the components of (A) and (B) satisfy (A)/(B)=1/1 to 1/3 (molar ratio). Further, the α-olefin-maleic acid copolymer is preferably a linear random copolymer having a weight-average molecular weight of 10,000 to 500,000.

In the present embodiment, the unit (A) based on the α-olefin refers to a structure represented by the general formula —$CH_2CR^1R^2$— (in the formula, $R^1$ and $R^2$ may be the same or different from each other, and each represent hydrogen or an alkyl group or an alkenyl group having a carbon number of 1 to 10). Also, the α-olefin used in the present embodiment is a straight-chain or branched olefin having a carbon-carbon unsaturated double bond at the α position. In particular, the α-olefin is preferably an olefin having a carbon number of 2 to 12, particularly 2 to 8. Typical examples of the α-olefin that can be used include ethylene, propylene, n-butylene, isobutylene, n-pentene, isoprene, 2-methyl-1-butene, 3-methyl-1-butene, n-hexene, 2-methyl-1-pentene, 3-methyl-1-pentene, 4-methyl-1-pentene, 2-ethyl-1-butene, 1,3-pentadiene, 1,3-hexadiene, 2,3-dimethylbutadiene, 2,5-pentadiene, 1,4-hexadiene, 2,2,4-trimethyl-1-pentene, and others. Among these, in particular, the α-olefin is preferably isobutylene in view of availability, polymerizability, and stability of the product. The term isobutylene is meant to include a mixture containing isobutylene as a major component, for example, a BB fraction (C4 fraction). These α-olefins may be used alone or in combination of two or more kinds thereof.

In the present embodiment, preferable examples of the unit (B) based on the maleic acid include maleic anhydride derivatives such as maleic anhydride, maleic acid, maleic acid monoesters (for example, methyl maleate, ethyl maleate, propyl maleate, phenyl maleate, and the like), maleic acid diesters (for example, dimethyl maleate, diethyl maleate, dipropyl maleate, diphenyl maleate, and the like), maleimide and N-substituted derivatives thereof (for example, N-substituted alkylmaleimides such as maleimide, N-methylmaleimide, N-ethylmaleimide, N-propylmaleimide, N-n-butylmaleimide, N-t-butylmaleimide, and N-cyclohexylmaleimide, N-substituted alkylphenylmaleimides such as N-phenylmaleimide, N-methylphenylmaleimide, and N-ethylphenylmaleimide, and N-substituted alkoxyphenylmaleirnides such as N-methoxyphenylmaleimide and N-ethoxyphenylmaleimide), and further, halides of these (for example, N-chlorophenylmaleimide), citraconic anhydride derivatives such as citraconic anhydride, citraconic acid, citraconic acid monoesters (for example, methyl citraconate, ethyl citraconate, propyl citraconate, phenyl citraconate, and the like), citraconic acid diesters (for example, dimethyl citraconate, diethyl citraconate, dipropyl citraconate, diphenyl citraconate, and the like), citraconimide and N-substituted derivatives thereof (for example, N-substituted alkylmaleimides such as citraconimide, 2-methyl-N-methylmal eimi de, 2-methyl-N-ethylmaleimide, 2-methyl-N-propylmaleimide, 2-methyl-N-n-butylmaleimide, 2-methyl-N-t-butylmaleimide, and 2-methyl-N-cyclohexylmaleimide, 2-methyl-N-substituted alkylphenylmaleimides such as 2-methyl-N-phenylmaleimide, 2-methyl-N-methylphenylmaleimide, and 2-methyl-N-ethylphenylmaleimide, and 2-methyl-N-substituted alkoxyphenylmaleimides such as 2-methyl-N-methoxyphenylmaleimide and 2-methyl-N-ethoxyphenylmaleimide), and further, halides of these (for example, 2-methyl-N-chlorophenylmaleimide). Among these, use of maleic anhydride is preferable in view of availability, polymerization speed, and facility of molecular weight adjustment. Further, these maleic acids may be used alone or in combination of two or more kinds thereof. As described above, the maleic acid is neutralized by an alkali salt, and the generated carboxylic acid and carboxylate is a form of 1,2-dicarboxylic acid or a salt. This form has a function of trapping heavy metals eluted from the positive electrode The content ratio of the above structural units in the copolymer of the present embodiment is preferably such that (A)/(B) is within a range of 1/1 to 1/3 in a molar ratio. This is because the above range gives advantages of hydrophilicity, water-solubility, and affinity to metals or ions as a polymer body that is dissolved into water. In particular, the molar, ratio of (A)/(B) is preferably 1/1 or a value near to this. In this case, the copolymer has a structure in which the unit based on the α-olefin, that is, the unit represented by —$CH_2CR^1R^2$— and the unit based on the maleic acid are alternately repeated.

The loading mixing ratio of the α-olefin and the maleic acid for obtaining the copolymer of the present embodiment may change in accordance with the composition of the intended copolymer; however, it is effective to use the α-olefin in a molar number being one to three times as large as the molar number of the maleic acid, in order to enhance the reaction ratio of the maleic acid.

A method for producing the copolymer of the present embodiment is not particularly limited and, for example, the copolymer can be obtained by radical polymerization. At that time, the polymerization catalyst to be used is preferably an azo catalyst such as azobisisobutyronitrile or 1,1-azobiscyclohexane-1-carbonitrile, or an organic peroxide catalyst such as benzoyl peroxide or dicumyl peroxide. The amount of use of the polymerization catalyst needs to be within a range of 0.1 to 5 mol % relative to the maleic acid, and a preferable range is 0.5 to 3 mol %. As a method for adding the polymerization catalyst and the monomer, these may be added in a lump at an initial stage of polymerization;

however, it is preferable to adopt a method in which these are sequentially added in accordance with the progression of polymerization.

In the method for producing the copolymer of the present embodiment, adjustment of the molecular weight can be suitably carried out mainly in accordance with monomer concentration, amount of use of the catalyst, and the polymerization temperature. For example, the molecular weight of the copolymer can be adjusted by adding a salt or hydroxide of a Group I, II, or III metal or a halide of a Group IV metal in the periodic table, a nitrogen compound such as an amine represented by the general formula N≡, HN═, H$_2$N—, or H$_4$N—, ammonium acetate, or urea, or a mercaptan as a substance that lowers the molecular weight at an early stage of polymerization or during the progress of polymerization. The polymerization temperature is preferably 40° C. to 150° C., more preferably within a range of 60° C. to 120° C. in particular. If the polymerization temperature is too high, the copolymer to be generated is liable to have a block shape, and there is a fear that the polymerization pressure becomes considerably high. Typically, the polymerization time is preferably about 1 to 24 hours, more preferably 2 to 10 hours. The amount of use of the polymerization catalyst is preferably adjusted so that the concentration of the copolymer to be obtained is 5 to 40 wt %, more preferably 10 to 30 wt %.

As described above, the copolymer of the present embodiment preferably has a weight-average molecular weight of typically 10,000 to 500,000. A more preferable weight-average molecular weight is 15,000 to 450,000. If the weight-average molecular weight of the copolymer of the present embodiment is less than 10,000, the crystallinity is high, raising a fear that the binding strength between the particles may be weak. On the other hand, if the weight-average molecular weight exceeds 500,000, the solubility into water or solvent decreases, and the copolymer may be easily deposited in some cases.

The weight-average molecular weight of the copolymer of the present embodiment can be determined, for example, by the light scattering method or the viscosity method. When the limiting viscosity ([η]) in dimethylformamide is measured by using the viscosity method, the copolymer of the present embodiment preferably has a limiting viscosity within a range of 0.05 to 1.5. The copolymer of the present embodiment is typically obtained in a powder form with a uniform size of about 16 to 60 mesh.

In the present embodiment, the neutralized salt of the copolymer is preferably a neutralized salt obtained by reaction of active hydrogen of the carbonyl acid generated from the maleic acid with a basic substance to form a salt. In the neutralized salt of the α-olefin-maleic acid copolymer used in the present embodiment, it is preferable to use a basic substance containing a monovalent metal and/or ammonia as the basic substance in view of the binding property as a binder.

In the present embodiment, the amount of use of the basic substance containing a monovalent metal and/or ammonia is not particularly limited and is suitably selected in accordance with the purpose of use or the like; however, typically, the amount is preferably 0.6 to 2.0 mol per one mol of the maleic acid unit in the maleic acid copolymer. It is considered that such an amount of use allows adjustment of the degree of neutralization in the binder composition of the present embodiment to a predetermined range. A water-soluble copolymer salt with less amount of residual alkali can be obtained when the amount of use of the basic substance containing a monovalent metal is set to be preferably 0.8 to 1.8 mol per one mol of the maleic acid unit in the maleic acid copolymer.

The reaction of the α-olefin-maleic acid copolymer with the basic substance containing a monovalent metal and/or ammonia can be performed in accordance with a conventional method; however, a method in which the reaction is performed in the presence of water to obtain the neutralized salt of the α-olefin-maleic acid copolymer as an aqueous solution is convenient and preferable.

Examples of the basic substance containing a monovalent metal that can be used in the present embodiment include hydroxides of an alkali metal such as sodium hydroxide, potassium hydroxide, and lithium hydroxide; carbonates of an alkali metal such as sodium carbonate and potassium carbonate; acetates of an alkali metal such as sodium acetate and potassium acetate; and phosphates of an alkali metal such as trisodium phosphate. Examples of the amine such as ammonia include primary amines such as ammonia, methylamine, ethylamine, butylamine, and octylamine, secondary amines such as dimethylamine diethylamine, and dibutylamine, tertiary amines such as trimethylamine, triethylamine, and tributylamine, and polyamines such as ethylenediamine, butylenediamine, diethyleneimine, triethyleneimine, and polyethyleneimine. Among these, ammonia, lithium hydroxide, sodium hydroxide, and potassium hydroxide are preferable. In particular, use of ammonia or lithium hydroxide is preferable as a binder for non aqueous electrolyte batteries. The basic substance containing a monovalent metal and/or ammonia may be used alone or in combination of two or more kinds thereof. Further, within a range that does not give adverse effects on the battery performance, a basic substance containing a hydroxide or the like of an alkali metal such as sodium hydroxide may be used in combination to prepare the neutralized salt of the α-olefin-maleic acid copolymer.

Next, in the present embodiment, the degree of neutralization for the carboxylic acid generated from the maleic acid in the copolymer of the binder composition is from 0.3 to 1.0. If the degree of neutralization is less than 0.3, the solubility into water or solvent decreases, and the copolymer is easily deposited to render the slurry-coating operation difficult. On the other hand, if the degree of neutralization exceeds 1.0, the basic substance involved in the neutralization is present in an excessive amount in the slurry, raising a fear of becoming a resistance component. More preferably, the degree of neutralization is within a range of 0.4 to 0.8. This makes it possible to obtain a slurry composition more excellent in coating property.

In the present embodiment, the degree of neutralization can be determined by using a method such as titration with a base, infrared spectrum, or NMR spectrum. In order to determine the point of neutralization conveniently and precisely, it is preferable to perform titration with a base. A specific method of titration is not particularly limited; however, the titration can be carried out by dissolving into water having less impurity, such as ion-exchange water, and performing neutralization with a basic substance such as lithium hydroxide, sodium hydroxide, or potassium hydroxide. An indicator for the point of neutralization is not particularly limited; however, an indicator that indicates pH with a base, such as phenolphthalein or a pH meter can be used.

In the present embodiment, the degree of neutralization of the binder composition may be adjusted by adjusting the degree of neutralization of the binder composition or by directly adjusting the degree of neutralization of an aqueous solution obtained by dissolving the binder composition. Specifically, for example, adjustment of the degree of neutralization can be made to be within the aforementioned range by adjusting the amount of addition of the basic substance containing a monovalent metal such as described above (ammonia, lithium hydroxide, sodium hydroxide, potassium hydroxide, or the like); however, the method of adjustment is not limited to this alone. Specifically, as described above, the degree of neutralization can be adjusted to be within the aforementioned range by addition of the basic substance containing a monovalent metal and/or ammonia preferably in an amount of 0.6 to 2.0 mol per one mol of the maleic acid unit in the maleic acid copolymer. More preferably, the degree of neutralization can be adjusted to be within the aforementioned range with more certainty by addition of the basic substance containing a monovalent metal and/or ammonia in an amount of 0.6 to 1.8 mol per one mol of the maleic acid unit in the maleic acid copolymer.

Next, in the present embodiment, the ring-opening ratio of the copolymer refers to the ratio of hydrolysis of the maleic anhydride site that is polymerized with the α-olefin when maleic anhydride is used as the maleic acid. In the copolymer of the present embodiment, a preferable ring-opening ratio is 60 to 100%, more preferably 70% to 100%, and still more preferably 80 to 100%. If the ring-opening ratio is too low, the structural degree of freedom of the copolymer decreases, and the copolymer comes to have a deficient extension/contraction property, thereby disadvantageously raising a fear that the force of bonding the adjacent electrode material particles may become smaller. Furthermore, there is a fear of raising a problem such that the affinity to water is low and the solubility is deficient. For the ring-opening ratio, the ratio can be determined, for example, by measuring the hydrogen at the α-position of the ring-opened maleic acid with $^1$H-NMR using the hydrogen located at the α-position of the maleic anhydride as a standard, or the ratio can be determined by IR measurement of the carbonyl group of the maleic acid and the carbonyl group deriving from the ring-opened maleic anhydride.

Next, in the copolymer of the present embodiment, the mass reduction ratio at 150° C. is preferably less than 5%. If the mass reduction ratio is 5% or more, there is a possibility that the capacity may decrease due to the heat generated when charging/discharging is repeatedly carried out.

In the present embodiment, the mass reduction ratio can be adjusted to be within the aforementioned range by, for example, adjusting the degree of neutralization of the copolymer contained in the binder composition; however, the method of adjustment is not limited to this alone. Also, when the degree of neutralization is of a certain degree or more (degree of neutralization=1), further adjustment can be made by adjusting the molecular weight of the copolymer.

In the present embodiment, the mass reduction ratio can be determined, for example, by a method described in the Examples mentioned later, although not particularly limited.

Next, when a two-electrode type electrolytic cell having the following specification is used in the present embodiment and electric potential seaming from 3 V to 4.5 V as determined by cyclic voltammetry under the following conditions I is carried out for three times, it is preferable that the amount of change in the reduction current value from the second time to the third time is 0.05 μA/cm$^2$ or less.

<<Specification of Two-Electrode Type Electrolytic Cell>>

Working electrode: One in which a layer made of the above binder composition is disposed on an aluminum foil (area φ13 mm, film thickness 7 μm)

Reference electrode, counter electrode: lithium foil

Electrolytic solution: lithium hexafluorophosphate solution of 1 mol/L (solvent: ethylene carbonate/diethyl carbonate=1/1 (volume ratio))

Sweeping speed: 0.1 mV/s

It is considered that an electrochemically stable binder composition can be obtained because the amount of change in the reduction current value from the second time to the third time is 0.05 μA/cm$^2$ or less when electric potential scanning from 3 V to 4.5 V as determined by cyclic voltammetry having the above specification is carried out for three times in the binder composition.

The slurry composition for non aqueous electrolyte batteries according to the present embodiment is characterized by containing a lithium-containing metal oxide, which is an active material, and a solvent in addition to the binder composition described above.

Examples of the lithium-containing metal oxide, which is an active material added to the slurry composition for non aqueous electrolyte batteries according to the present embodiment (which may be hereafter simply abbreviated as an active material), include lithium iron phosphate ($LiFePO_4$), lithium manganese phosphate ($LiMnPO_4$), lithium cobalt phosphate ($LiCoPO_4$), lithium iron pyrophosphate ($Li_2FeP_2O_7$), lithium cobaltate composite oxide ($LiCoO_2$), spinel type lithium manganate composite oxide ($LiMn_2O_4$), lithium manganate composite oxide ($LiMnO_2$), lithium nickelate composite oxide ($LiNiO_2$), lithium niobate composite oxide ($LiNbO_2$), lithium ferrate composite oxide ($LiFeO_2$), lithium magnesium composite oxide ($LiMgO_2$), lithium calcium composite oxide ($LiCaO_2$), lithium cuprate composite oxide ($LiCuO_2$), lithium zincate composite oxide ($LiZnO_2$), lithium molybdate composite oxide ($LiMoO_2$), lithium tantalate composite oxide ($LiTaO_2$), lithium tungstate composite oxide ($LiWO_2$), lithium-nickel-cobalt-aluminum composite oxide ($LiNi_{0.8}Co_{0.15}Al_{0.05}O_2$), lithium-nickel-cobalt-manganese composite oxide ($LiNi_{0.33}Co_{0.33}Mn_{0.33}O_2$), Li-excessive nickel-cobalt-manganese composite oxide ($LixNiACoBMnCO_2$ solid solution), nickel manganese oxide ($LiNi_{0.5}Mn_{1.5}O_4$), manganese oxide ($MnO_2$), vanadium-based oxide, sulfur-based oxide, silicate-based oxide, and the like.

Use of such a lithium-containing metal oxide as an active material gives an advantage of forming a useful positive electrode because the electric potential is high.

(Positive Electrode of Lithium Ion Battery)

Typically, in the slurry composition for non aqueous electrolyte batteries, the amount of use of the neutralized salt of the α-olefin-maleic acid copolymer relative to 100 parts by weight of the lithium-containing metal oxide serving as an active material is preferably 0.1 to 20 parts by weight, more preferably 0.3 to 10 parts by weight, and still more preferably 0.5 to 8 parts by weight. If the amount of the copolymer is excessively small, the viscosity of the slurry for electrodes is too low, thereby raising a fear that the thickness of the mixed layer may be thin. Conversely, if the amount of the copolymer is excessively large, there is a possibility that the discharge capacity may decrease.

On the other hand, typically, the amount of the solvent in the slurry composition for non aqueous electrolyte batteries relative to 100 parts by weight of the lithium-containing metal oxide serving as an active material is preferably 10 to 150 parts by weight, more preferably 30 to 130 parts by weight.

Examples of the solvent in the slurry composition for non aqueous electrolyte batteries according to the present embodiment include water, alcohols such as methanol, ethanol, propanol, and 2-propanol, cyclic ethers such as tetrahydrofuran and 1,4-dioxane, amides such as N,N-dimethylformamide and N,N-dimethylacetamide, cyclic amides such as N-methylpyrrolidone and N-ethylpyrrolidone, and sulfoxides such as dimethyl sulfoxide. Among these, use of water is preferable in view of safety.

Also, when water is used as the solvent of the slurry composition for non aqueous electrolyte batteries according to the present embodiment, an organic solvent mentioned below may be used in combination within a range of preferably 20 wt % or less relative to the total amount of the solvent. Such an organic solvent is preferably one having a boiling point at an ordinary pressure of 100° C. or higher to 300° C. or lower, and examples thereof include organic dispersion media such as hydrocarbons such as n-dodecane; alcohols such as 2-ethyl-1-hexanol and 1-nonanol; esters such as γ-butyrolactone and methyl lactate; amides such as N-methylpyrrolidone, N,N-dimethylacetamide, and dimethylformamide; sulfoxides and sulfones such as dimethyl sulfoxide and sulfolane.

In the present embodiment, a thickening agent and an electroconductive auxiliary agent may be further added into the slurry composition for non aqueous electrolyte batteries in accordance with the needs.

The thickening agent that can be added is not particularly limited, and various kinds of alcohols, particularly polyvinyl alcohol and modified products thereof, celluloses, and polysaccharides such as starch can be used.

The amount of use of the thickening agent that is blended into the slurry composition for non aqueous electrolyte batteries in accordance with the needs relative to 100 parts by weight of the lithium-containing metal oxide serving as an active material is preferably about 0.1 to 4 parts by weight, more preferably 0.3 to 3 parts by weight, and still more preferably 0.5 to 2 parts by weight. If the amount of the thickening agent is excessively small, the viscosity of the slurry for non aqueous electrolyte batteries is too low, and the thickness of the mixed layer may be thin in some cases. Conversely, if the amount of the thickening agent is excessively large, the discharge capacity may decrease in some cases.

Also, the electroconductive auxiliary agent that is blended into the slurry composition for non aqueous electrolyte batteries in accordance with the needs may be, for example, a metal powder, an electroconductive polymer, acetylene black, or the like. Typically, the amount of use of the electroconductive auxiliary agent relative to 100 parts by weight of the active material is preferably 0.3 to 10 parts by weight, more preferably 0.5 to 7 parts by weight.

In the present embodiment, the non aqueous electrolyte battery positive electrode is characterized by being formed by binding a mixed layer containing at least the slurry composition for non aqueous electrolyte batteries according to the present embodiment to a current collector.

The above positive electrode can be formed by applying the slurry composition for non aqueous electrolyte batteries described above onto a current collector and thereafter removing the solvent by a method such as drying.

The current collector used in the non aqueous electrolyte battery positive electrode of the present embodiment is not particularly limited as long as the current collector is made of an electroconductive material and, for example, metal materials such as iron, copper, aluminum, nickel, stainless steel, titanium, tantalum, gold, and platinum can be used. These may be used alone or in combination of two or more kinds thereof at an arbitrary ratio.

In particular, when aluminum is used as a positive electrode current collector, the effect of the slurry for non aqueous electrolyte batteries of the present invention is most conspicuous. The shape of the current collector is not particularly limited; however, typically, the current collector is preferably in a sheet form having a thickness of about 0.001 to 0.5 min.

A method for applying the slurry for non aqueous electrolyte batteries onto the current collector is not particularly limited. For example, the method may be the doctor blade method, the dipping method, the reverse roll method, the direct roll method, the gravure method, the extrusion method, the immersion method, the brush coating method, or the like. The amount of applying the slurry is not also particularly limited; however, the amount is generally such that the thickness of the mixed layer containing the active material, the electroconductive auxiliary agent, the binder, and the thickening agent formed after removal of the solvent or dispersion medium by a method such as drying is preferably 0.005 to 5 mm, more preferably 0.01 to 2 mm.

A method of drying the solvent such as water contained in the slurry composition for non aqueous electrolyte batteries is not particularly limited and may be, for example, aeration drying by warm air, hot air, or low-humidity air; vacuum drying; radiation drying by infrared rays, far infrared rays, or electron beams; or the like. The drying conditions are preferably adjusted so that the solvent can be removed as quickly as possible within a speed range such that cracks may not be generated in the active material layer by stress concentration or the active material layer may not be peeled off from the current collector. Further, it is effective to press the current collector after drying in order to increase the density of the active material of the electrode. A pressing method may be, for example, mold pressing, roll pressing, or the like.

Furthermore, the scope of the present invention includes a non aqueous electrolyte battery including the non aqueous electrolyte battery positive electrode described above, a negative electrode, and an electrolytic solution.

In the present embodiment, a material typically used in non aqueous electrolyte batteries can be used as the negative electrode. For example, at least one element selected from the group consisting of Li, Na, C, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi, an alloy using these elements, an oxide, a chalcogenide, a halogenide, or the like is used. Also, the negative electrode can be produced, for example, by applying a negative electrode slurry, which is prepared by mixing a negative electrode active material, an electroconductive auxiliary agent similar to that of the positive electrode, and a binder such as SBR, NBR, acrylic rubber, hydroxyethyl cellulose, carboxymethyl cellulose, or polyvinylidene fluoride into a solvent, onto a negative electrode current collector such as copper, and drying the solvent.

Also, in the non aqueous electrolyte battery of the present embodiment, an electrolytic solution obtained by dissolving an electrolyte into a solvent can be used. The electrolytic solution may be either in a liquid form or in a gel form as long as the electrolytic solution is one used in an ordinary non aqueous electrolyte battery, and an electrolytic solution exhibiting a function as a battery in accordance with the types of the negative electrode active material and the positive electrode active material may be suitably selected. As a specific electrolyte, for example, all lithium salts conventionally known can be used, and examples thereof include $LiClO_4$, $LiBF_6$, $LiPF_6$, $LiCF_3SO_3$, $LiCF_3CO_2$, $LiAsF_6$, $LiSbSF_6$, $LiB_{10}Cl_{10}$, $LiAlCl_4$, LiCl, LiBr, LiB $(C_2H_5)_4$, $CF_3SO_3Li$, $CH_3SO_3Li$, $LiCF_3SO_3$, $LiC_4F_9SO_3$, $Li(CF_3SO_2)_2N$, and lower aliphatic carboxylic acid lithium.

The solvent into which such an electrolyte is dissolved (electrolytic solution solvent) is not particularly limited. Specific examples thereof include carbonates such as propylene carbonate, ethylene carbonate, butylene carbonate, dimethyl carbonate, and diethyl carbonate; lactones such as γ-butyrolactone; ethers such as trimethoxymethane, 1,2-dimethoxyethane, diethyl ether, 2-ethoxyethane, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile and nitromethane; organic acid esters such as methyl formate, methyl acetate, ethyl acetate, butyl acetate, methyl propionate, and ethyl propionate; inorganic acid esters such as triethyl phosphate, di methyl carbonate, and diethyl carbonate; diglymes; triglymes; sulfolanes; oxazolidinones such as 3-methyl-2-oxazolidinone; and sultones such as 1,3-propanesultone, 1,4-butanesultone, and naphthasultone. These may be used alone or in combination of two or more kinds thereof. When an electrolytic solution in a gel form is used, a nitrile-based polymer, an acryl-based polymer, a fluorine-based polymer, an alkylene oxide-based polymer, or the like can be added as a gelling agent.

A method for producing the non aqueous electrolyte battery of the present embodiment is not particularly limited and, for example, the following production method can be exemplified. That is, a positive electrode and a negative electrode are superposed with a separator such as a polypropylene porous membrane interposed therebetween, and the resultant is put into a battery container after being subjected to winding, folding, or the like in accordance with the shape of the battery, followed by injecting an electrolytic solution and sealing. The shape of the battery may be any of a known coin type, button type, sheet type, cylindrical type, prismatic type, and flat type.

The non aqueous electrolyte battery of the present embodiment is a battery in which adhesion and improvement of the battery characteristics are compatible with each other, so that the battery is useful for various purposes. For example, the battery of the present embodiment is extremely useful also as a battery used in portable terminals in which scale reduction, thickness reduction, weight reduction, and performance enhancement are demanded.

As described above, the present specification discloses techniques in various modes. Among these, principal techniques are summarized as follows.

That is, a slurry composition for non aqueous electrolyte battery electrodes that contains a binder composition, an active material, and a solvent according to one aspect of the present invention (which may hereafter be simply referred to as a slurry composition) is characterized in that the active material is a lithium-containing metal oxide, that the binder composition contains a neutralized salt of an α-olefin-maleic acid copolymer in which an α-olefin and a maleic acid are copolymerized, and that a degree of neutralization for carboxylic acid generated from the maleic acid in the copolymer is from 0.3 to 1.0.

It is considered that, by such a configuration, an improvement in the battery characteristics can be achieved without deteriorating the binding property between the current collector electrodes and between the active materials.

In particular, since the degree of neutralization of the aqueous solution is from 0.3 to 1.0 in the binder composition, the amount of the carboxylic acid generated from the maleic acid increases, and accordingly, the adhesion to the current collector foil and the binding property between the molecules are enhanced. This eventually has an advantage of eliminating the need for use of a thickening agent, a dispersant, and the like.

A non aqueous electrolyte battery positive electrode according to still another aspect of the present invention is characterized by being formed by binding a mixed layer containing at least the slurry composition for non aqueous electrolyte batteries described above to a current collector.

Further, a non aqueous electrolyte battery according to still another aspect of the present invention is characterized by including the positive electrode described above, a negative electrode, and an electrolytic solution.

EXAMPLES

Hereafter, Examples of the present invention will be described; however, the present invention is not limited to these Examples.

Example 1

<Binder Composition>

As the binder composition, 25 g (0.16 mol) of a water-soluble lithium modified isobutene-maleic anhydride copolymer resin (average molecular weight of 325,000, degree of neutralization of 1.0, and ring-opening ratio of 100%) was used to prepare a 10 wt % aqueous solution, and this was used in the following test. Adjustment of the degree of neutralization was carried out by addition of lithium hydroxide at an amount of 2.0 equivalents (0.320 mol) relative to the maleic acid unit in the maleic acid copolymer.

<Electrode for CV of Binder Composition for Non Aqueous Electrolyte Batteries>

The 10 wt % aqueous solution of the binder composition was applied onto an aluminum foil (IN30-H, manufactured by Fuji Impex Corp) of a current collector with use of a bar coater (T101, manufactured by Matsuo Sangyo Co., Ltd.), and primary drying was carried out at 80° C. for 30 minutes with use of a hot air dryer (manufactured by Yamato Scientific Co., Ltd.). Thereafter, a battery electrode (φ13 mm, film thickness of 7 μm) was stamped out from the resulting product, and subsequently, an electrode for CV was prepared by secondary drying at 120° C. for 3 hours under reduced-pressure conditions.

<Preparation of Two-Electrode Type Electrolytic Cell for CV>

The electrode for CV obtained in the above was transferred to a glove box (manufactured by MIWA MFG Co., Ltd.) disposed in an argon gas atmosphere. A metal lithium foil (having a thickness of 0.2 mm, φ16 mm) was used as a reference electrode that also served as a counter electrode. A polypropylene-based membrane (Celgard #2400, manufactured by Polypore) was used as a separator, and a solution of lithium hexafluorophosphate ($LiPF_6$) in a mixed solvent of ethylene carbonate (EC) and diethyl carbonate (DEC) (1M-$LiPF_6$, EC/DEC=1/1 vol %) was used as an electrolytic solution and injected, so that a coin-type two-electrode cell was prepared.

<Measurement of Electrochemical Properties (CV)>

The coin-type two-electrode type electrolytic cell prepared in the above was subjected to oxidation-reduction current measurement with use of a Potentio/Galvanostat 1287 type (manufactured by Solartron). The measurement was carried out under conditions with a sweeping speed of 1 mV/s and a sweeping range of 0 to 3 V to measure the current value observed at each scanning time. The reduction current values at a voltage value of 4.4 V at the second time and at the third time were read, and the difference in the current value was divided by the area of the working electrode to calculate the amount of change. The above results are shown in the following Table 1.

<Measurement of Mass Reduction Ratio of Binder Composition for Non Aqueous Electrolyte Batteries>

Thermal weight measurement was carried out with use of a thermoanalyzer (manufactured by Yamato Scientific Co., Ltd.). The measurement was carried out with a measurement temperature range of 50° C. to 1000° C. and a temperature-raising speed of 20° C./minute. As a result, the mass reduction ratio at 150° C. was 0.3%. The results are shown in the following Table 1.

<Preparation of Positive Electrode Slurry>

Preparation of electrode slurry was carried out in the following manner. With respect to 100 parts by weight of lithium iron phosphate (LFP: purchased from Hohsen Corp.) serving as an active material, a 10 wt % aqueous solution of the positive electrode binder composition at 5.56 parts by weight in terms of solid components and DENKA BLACK (powdery form, manufactured by Denka Company Limited) serving as an electroconductive auxiliary agent (electroconductivity imparting agent) at 5.56 parts by weight in terms of solid components were put into an exclusive-use container, followed by kneading with use of a planetary stirrer (ARE-250, manufactured by Thinky Corporation). For adjustment of slurry viscosity, water was added during the kneading, and the kneading was carried out again to prepare a slurry for electrode coating. The composition ratio of the active material and the binder in the slurry was lithium iron phosphate:electroconductive auxiliary agent:binder composition=100:5.56:5.56 in terms of solid components. Also, the amount of water serving as a solvent was 75.1 wt % relative to the active material.

<Measurement of pH of Binder Composition for Non Aqueous Electrolyte Batteries>

With use of a glass electrode pH meter (D-51, manufactured by Horiba, Ltd.), pH measurement was carried out on the 10 wt % aqueous solution of the binder composition. The results are shown in the following Table 1.

<Preparation of Positive Electrode for Batteries>

The obtained slurry was applied onto an aluminum foil (IN30-H, manufactured by Fuji Impex Corp) of a current collector with use of a film applicator (manufactured by Tester Sangyo Co., Ltd.), and primary drying was carried out at 80° C. for 30 minutes with use of a hot air dryer (manufactured by Yamato Scientific Co., Ltd.), followed by performing a rolling treatment with use of a roll press (manufactured by Hohsen Corp.). Thereafter, a battery electrode (14 mm) was stamped out from the resulting product, and subsequently, an electrode for coin batteries was prepared by secondary drying at 120° C. for 3 hours under reduced-pressure conditions.

<Thickness Measurement of Positive Electrode for Batteries>

The weight and thickness of the coated electrode for batteries obtained in the above (active material layer thickness of about 44 µm, active material weight of about 10.5 mg) were measured. For the thickness measurement, a constant-pressure thickness measurement device (manufactured by TECLOCK Corporation) was used, and the measurement was carried out on four sheets of the electrodes each at three points, with a result of 44±0.5 µm.

<Electrode Coating Property>

With regard to the electrode coating property, measurement was carried out on four sheets of the electrodes each at three points using variation of the electrode film thickness as an index. When the variation was 0 to ±0.5 µm relative to the average film thickness, the coating property was evaluated as "very good". When the variation was ±0.5 to ±1.0 µm relative to the average film thickness, the coating property was evaluated as "good". When the variation was ±1.0 to ±2.0 µm relative to the average film thickness, the coating property was evaluated as "fair". When the variation was ±2.0 µm or more relative to the average film thickness, the coating property was evaluated as "poor". The results are shown in the following Table 1.

<Preparation of Battery>

The coated electrode for batteries obtained in the above was transferred to a glove box (manufactured by MIWA MFG Co., Ltd.) disposed in an argon gas atmosphere. A metal lithium foil (having a thickness of 0.2 mm, φ16 mm) was used as a counter electrode. A polypropylene-based membrane (Celgard #2400, manufactured by Polypore) was used as a separator, and a solution of lithium hexafluorophosphate ($LiPF_6$) in a mixed solvent of ethylene carbonate (EC) and diethyl carbonate (DEC) (1M-$LiPF_6$, EC/DEC=1/1 vol %) was used as an electrolytic solution and injected, so that a coin battery (2032 type) was prepared.

<Evaluation Method: Charge/Discharge Characteristics Test>

The prepared coin battery was subjected to charge/discharge test with use of a commercially available charge/discharge tester (TOSCAT3100, manufactured by Toyo System Co., Ltd.). The coin battery was placed in a thermostat of 25° C. and, for charging, constant-current charging of 0.05 C (about 0.06 $mA/cm^2$) relative to the active material amount was carried out until 4 V was attained relative to the electric potential of lithium. The capacity at that time was determined as a charge capacity (mAh/g). Subsequently, constant-current discharging of 0.05 C (about 0.06 $mA/cm^2$) was carried out down to 2 V relative to the electric potential of lithium, and the capacity at that time was determined as a discharge capacity (mAh/g). The percentage of discharge capacity/charge capacity was determined as charge/discharge efficiency. For the alternating current resistance of the coin battery, a resistance value after charging was carried out once (fully charged state) was adopted. The above results are shown in the following Table 1.

For the discharge capacity retention ratio (%) of the coin battery, a ratio of the discharge capacity at the twentieth time relative to the discharge capacity at the first time was determined using the charging/discharging conditions described above. The results are shown in the following Table 1.

Example 2

As the binder composition, a 10 wt % aqueous solution of a water-soluble lithium modified isobutene-maleic anhydride copolymer resin (average molecular weight of 325, 000, degree of neutralization of 0.5, and ring-opening ratio of 96%) was prepared and used in the following test. Adjustment of the degree of neutralization was carried out by addition of lithium hydroxide at an amount of 1.0 equivalent (0.160 mol) relative to the maleic acid unit in the maleic acid copolymer.

An electrode for CV and a two-electrode type electrolytic cell were prepared in the same manner as in Example 1, and the CV measurement was carried out, with a result that the amount of change in the reduction current value was $0.03_R A/cm^2$.

Measurement of the mass reduction ratio of the binder composition was carried out in the same manner as in Example 1, with a result that the mass reduction ratio at 150° C. was 0.5%. The results are shown in the following Table 1.

A slurry for non aqueous electrolyte batteries was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 43±0.3 µm. The above results are shown in the following Table 1.

Example 3

As the binder composition, a 10 wt % aqueous solution of a water-soluble lithium modified isobutene-maleic anhydride copolymer resin (average molecular weight of 325,000, degree of neutralization of 0.3, and ring-opening ratio of 82%) was prepared and used in the following test. Adjustment of the degree of neutralization was carried out by addition of lithium hydroxide at an amount of 0.60 equivalents (0.096 mol) relative to the maleic acid unit in the maleic acid copolymer.

An electrode for CV and a two-electrode type electrolytic cell were prepared in the same manner as in Example 1, and the CV measurement was carried out, with a result that the amount of change in the reduction current value was 0.04 µA/c².

Measurement of the mass reduction ratio of the binder composition was carried out in the same manner as in Example 1, with a result that the mass reduction ratio at 150° C. was 1.2%. The results are shown in the following Table 1.

A slurry for non aqueous electrolyte batteries was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 44±0.5 µm. The above results are shown in the following Table 1.

Example 4

An electrode for CV and a two-electrode type electrolytic cell were prepared in the same manner as in Example 1 except that the active material in Example 1 was changed to 100 parts by weight of an active material ($LiMnO_2$), and the CV measurement was carried out. As a result, the amount of change in the reduction current value was 0.10 µA/cm².

Measurement of the mass reduction ratio of the binder composition was carried out in the same manner as in Example 1, with a result that the mass reduction ratio at 150° C. was 1.01%. The results are shown in the following Table 1.

A slurry for non aqueous electrolyte batteries was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 50±0.5 µm. The above results are shown in the following Table 1.

Example 5

As the binder composition, a 50% Na salt of a 51.2 wt % aqueous solution of polyacrylic acid (average molecular weight of 187,000, degree of neutralization of 0.5, pH of 6.6, manufactured by Sigma-Aldrich) at 5.55 parts by weight in terms of solid components relative to 100 parts by weight of an active material ($LiNiO_2$) was used, and an electrode for CV and a two-electrode type electrolytic cell were prepared in the same manner as in Example 1 to carry out the CV measurement. As a result, the amount of change in the reduction current value was 0.10 µA/cm².

Measurement of the mass reduction ratio of the binder composition was carried out in the same manner as in Example 1, with a result that the mass reduction ratio at 150° C. was 10.1%. The results are shown in the following Table 1.

A slurry for non aqueous electrolyte batteries was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 54±0.6 µm. The above results are shown in the following Table 1.

Comparative Example 1

An attempt to obtain a water-soluble lithium modified isobutene-maleic anhydride copolymer resin (average molecular weight of 325,000) having a degree of neutralization of 0.2 was made by addition of lithium hydroxide at an amount of 0.4 equivalents (0.064 mol) relative to the maleic acid unit in the maleic acid copolymer; however, the solubility was low, and the water-soluble resin could not be obtained. Accordingly, the binder composition could not be produced.

Comparative Example 2

As the binder for positive electrodes, a 48.3 wt % aqueous solution of styrene-butadiene rubber (SBR) at 4.44 parts by weight in terms of solid components relative to 100 parts by weight of the active material and a 1.0 wt % aqueous solution of carboxymethyl cellulose-sodium salt (CMC-Na) at 1.11 parts by weight in terms of solid components were used, and an electrode for CV and a two-electrode type electrolytic cell were prepared in the same manner as in Example 1 to carry out the CV measurement. As a result, the amount of change in the reduction current value was 0.10 µA/cm².

Measurement of the mass reduction ratio of the carboxymethyl cellulose-sodium salt (CMC-Na) was carried out in the same manner as in Example 1, with a result that the mass reduction ratio at 150° C. was 7.1%. The results are shown in the following Table 1.

As the binder for positive electrodes, a 48.3 wt % aqueous solution of SBR at 4.44 parts by weight in terms of solid components relative to 100 parts by weight of the active material and a 1.0 wt % aqueous solution of CMC-Na at 1.11 parts by weight in terms of solid components were used, and a slurry for electrodes was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 54±0.5 µm. The above results are shown in the following Table 1.

Comparative Example 3

As the binder composition, a 50% Na salt of a 51.2 wt % aqueous solution of polyacrylic acid (average molecular weight of 187,000, degree of neutralization of 0.5, pH of 6.6, manufactured by Sigma-Aldrich) at 5.55 parts by weight in terms of solid components relative to 100 parts by weight of the active material was used, and an electrode for CV and a two-electrode type electrolytic cell were prepared in the same manner as in Example 1 to carry out the CV measurement. As a result, the amount of change in the reduction current value was 0.12 µA/cm$^2$.

Measurement of the mass reduction ratio of the binder composition was carried out in the same manner as in Example 1, with a result that the mass reduction ratio at 150° C. was 10.1%. The results are shown in the following Table 1.

A slurry for non aqueous electrolyte batteries was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 47±0.5 µm. The above results are shown in the following Table 1.

Comparative Example 4

An electrode for CV and a two-electrode type electrolytic cell were prepared in the same manner as in Example 1 except that the active material in Comparative Example 3 was changed to 100 parts by weight of an active material (LiMnO$_2$), and the CV measurement was carried out. As a result, the amount of change in the reduction current value was 0.14 µA/cm$^2$.

Measurement of the mass reduction ratio of the binder composition was carried out in the same manner as in Example 1, with a result that the mass reduction ratio at 150° C. was 10.1%. The results are shown in the following Table 1.

A slurry for non aqueous electrolyte batteries was prepared in the same manner as in Example 1. Further, a positive electrode was prepared in the same manner as in Example 1 to obtain a coin battery, and a charge/discharge characteristics test was carried out. The film thickness measured in the same manner as in Example 1 was 52±0.5 µm. The above results are shown in the following Table 1.

TABLE 1

| | Resin | | | | Active material | | Electroconditive auxiliary agent | | |
|---|---|---|---|---|---|---|---|---|---|
| | Average Molecular weight | Ring opening ratio (%) | Degree of neutralization | Amount (parts by weight) | Type | Amount (parts by weight) | Type | Amount (parts by weight) | Water Amount (wt %) |
| Example 1 | 325000 | 100 | 1 | 5.56 | LFP | 100 | DENKA BLACK | 5.56 | 75.1 |
| Example 2 | 325000 | 96 | 0.5 | 5.56 | LFP | 100 | DENKA BLACK | 5.56 | 75.1 |
| Example 3 | 325000 | 82 | 0.3 | 5.56 | LFP | 100 | DENKA BLACK | 5.56 | 75.1 |
| Example 4 | 325000 | 100 | 1 | 5.56 | LiMnO$_2$ | 100 | DENKA BLACK | 5.56 | 75.1 |
| Example 5 | 325000 | 100 | 1 | 5.56 | LiNiO$_2$ | 100 | DENKA BLACK | 5.56 | 75.1 |
| Comparative Example 1 | — | — | 0.2 | — | — | — | — | — | — |
| Comparative Example 2 | SBR-CMC | — | — | 5.56 | LFP | 100 | DENKA BLACK | 5.56 | 75.1 |
| Comparative Example 3 | 187000 | — | 0.5 | 5.55 | LFP | 100 | DENKA BLACK | 5.56 | 75.1 |
| Comparative Example 4 | 187000 | — | 0.5 | 5.55 | LiMnO$_2$ | 100 | DENKA BLACK | 5.56 | 75.1 |

| | Evaluation | | | | | | | |
|---|---|---|---|---|---|---|---|---|
| | pH | Coating property | Elecro-chemical characteristics (µA/cm$^2$) | Mass reduction ratio (%) | Charge capacity (mAh/g) | Discharge capacity (mAh/g) | Charge/discharge efficiency (%) | Alternating current resistance (Ω) | Capacity retention ratio (%) |
| Example 1 | 10.3 | good | 0.03 | 0.3 | 160 | 160 | 100 | 4 | 99.7 |
| Example 2 | 6.5 | very good | 0.03 | 0.5 | 160 | 160 | 100 | 6 | 99.8 |
| Example 3 | 4.2 | fair | 0.04 | 1.2 | 159 | 159 | 100 | 7 | 99.6 |
| Example 4 | 10.3 | good | 0.1 | 1.0 | 108 | 108 | 100 | 5 | 98.9 |
| Example 5 | 10.3 | good | 0.1 | 1.1 | 192 | 192 | 100 | 6 | 98.3 |
| Comparative Example 1 | — | — | — | — | — | — | — | — | — |
| Comparative Example 2 | — | poor | 0.10 | 7.1 | 157 | 157 | 100 | 10 | 98.5 |
| Comparative Example 3 | 6.6 | fair | 0.12 | 10.1 | 160 | 142 | 88.8 | 21.0 | 96.3 |
| Comparative Example 4 | 6.6 | fair | 0.14 | 10.1 | 108 | 98 | 90.7 | 19.8 | 92.7 |

(Studies)

As compared with SBR/CMC-Na that is used for general purposes, the binder compositions of Examples 1 to 3 in which the degree of neutralization of the binder compositions was within a range of 0.3 to 1.0 were shown to be electrically stable up to 4.5 V from the CV measurement, and also were shown to be thermally stable from the mass reduction ratio measurement. Also, with use of the binder composition described above, a slurry for electrodes that was excellent in the coating property could be prepared without addition of additives such as a thickening agent. As will be clear from Table 1, the batteries of Examples 1 to 3 were shown to achieve resistance reduction and high discharge capacity retention ratio.

In contrast, in Comparative Example 1 in which the aforementioned degree of neutralization was less than the range of the present invention, the binder composition could not be produced. Also, in Comparative Example 2 in which general-purpose SBR/CMC-Na was used as the binder composition, the mass reduction ratio of the binder was large; the coating property was poor; and the battery resistance was high. Further, in Comparative Examples 3 to 4 in which general-purpose polyacrylic acid was used, the mass reduction ratio of the binder was large; the coating property was poor; and the battery resistance was high.

This application is based on Japanese Patent Application No. 2015-156094 filed on Aug. 6, 2015, and the contents thereof are incorporated in the present application.

In order to express the present invention, the present invention has been appropriately and fully described by way of embodiments with reference to the drawings and the like in the above; however, it is to be recognized that those skilled in the art can readily make changes and/or modifications on the above-described embodiments. Therefore, it is to be interpreted that the changed modes or modified modes carried out by those skilled in the art are encompassed within the scope of the rights of the claims unless those changed modes or modified modes are at a level that departs from the scope of the rights of the claims as given in the claims section of the present specification.

INDUSTRIAL APPLICABILITY

The present invention has an industrial applicability in a wide range in the technical field of non aqueous electrolyte batteries.

The invention claimed is:

1. A slurry composition, comprising an aqueous solution of a binder composition, an active material, and a solvent, wherein
    the active material is a lithium-containing metal oxide,
    the binder composition comprises a neutralized salt of an α-olefin-maleic acid copolymer in which an α-olefin and a maleic acid are copolymerized,
    a degree of neutralization for carboxylic acid generated from the maleic acid in the copolymer is from 0.3 to 1.0,
    an amount of the neutralized salt of the α-olefin-maleic acid copolymer relative to 100 parts by weight of the lithium-containing metal oxide is 0.3 to 20 parts by weight, and
    a ring opening ratio of the copolymer is from 60 to 100%.

2. A nonaqueous electrolyte battery positive electrode formed by binding a mixed layer comprising the slurry composition according to claim 1 to a current collector.

3. A nonaqueous electrolyte battery comprising the nonaqueous electrolyte battery positive electrode according to claim 2.

4. The slurry composition according to claim 1, wherein
    the lithium-containing metal oxide is lithium iron phosphate, and
    the α-olefin used in the α-olefin-maleic acid copolymer is isobutylene.

5. The slurry composition according to claim 1, wherein the amount of the neutralized salt of the α-olefin-maleic acid copolymer relative to 100 parts by weight of the lithium-containing metal oxide is 0.5 to 10 parts by weight.

6. The slurry composition according to claim 1, wherein the amount of the neutralized salt of the α-olefin-maleic acid copolymer relative to 100 parts by weight of the lithium-containing metal oxide is 0.5 to 8 parts by weight.

7. The slurry composition according to claim 6, wherein
    the lithium-containing metal oxide is lithium iron phosphate, lithium nickelate composite oxide, or lithium manganate composite oxide, and
    the α-olefin used in the α-olefin-maleic acid copolymer is isobutylene.

8. The slurry composition according to claim 1, wherein the α-olefin is not ethylene.

9. The slurry composition according to claim 1, wherein the copolymer is isobutene-maleic acid copolymer resin.

10. The slurry composition according to claim 1, wherein the ring opening ratio of the copolymer is from 80 to 100%.

* * * * *